(12) United States Patent
Yokokawa

(10) Patent No.: US 11,448,884 B2
(45) Date of Patent: Sep. 20, 2022

(54) IMAGE BASED FINGER TRACKING PLUS CONTROLLER TRACKING

(71) Applicant: Sony Interactive Entertainment Inc., Tokyo (JP)

(72) Inventor: Yutaka Yokokawa, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/104,539

(22) Filed: Nov. 25, 2020

(65) Prior Publication Data

US 2022/0163800 A1 May 26, 2022

(51) Int. Cl.
| | | |
|---|---|---|
| *G02B 27/01* | (2006.01) | |
| *G02B 27/00* | (2006.01) | |
| *G06F 3/041* | (2006.01) | |
| *G06N 3/02* | (2006.01) | |
| *A63F 13/23* | (2014.01) | |

(52) U.S. Cl.
CPC .......... *G02B 27/0172* (2013.01); *A63F 13/23* (2014.09); *G02B 27/0093* (2013.01); *G06F 3/0416* (2013.01); *G06N 3/02* (2013.01); *G02B 2027/0138* (2013.01); *G02B 2027/0178* (2013.01)

(58) Field of Classification Search
USPC .......................................................... 345/8
See application file for complete search history.

(56) References Cited

U.S. PATENT DOCUMENTS

| | | | | |
|---|---|---|---|---|
| 2003/0234823 | A1* | 12/2003 | Sato ...................... | G06F 3/0346 715/848 |
| 2010/0033427 | A1* | 2/2010 | Marks ................ | H04N 1/00129 348/E5.022 |
| 2012/0098765 | A1* | 4/2012 | Soderstrom ......... | G06F 3/03547 345/173 |
| 2014/0364215 | A1* | 12/2014 | Mikhailov .............. | A63F 13/00 463/31 |
| 2015/0094142 | A1* | 4/2015 | Stafford .................. | G06F 3/011 463/31 |
| 2015/0293689 | A1* | 10/2015 | Lin .......................... | G06F 3/011 715/863 |
| 2015/0370401 | A1* | 12/2015 | Mizuhashi ............ | G06F 3/0446 345/174 |
| 2016/0357261 | A1* | 12/2016 | Bristol .................. | G06F 1/1686 |
| 2017/0090616 | A1* | 3/2017 | Ahsan ................. | G06F 3/04166 |
| 2017/0358139 | A1* | 12/2017 | Balan .................... | G06F 3/0346 |

(Continued)

OTHER PUBLICATIONS

Carriera et al., "Human Pose Estimation with Iterative Error Feedback", Proceedings of the IEEE Conference on Computer Vision and Pattern Recognition (CVPR), 2016, pp. 4733-4742.

(Continued)

*Primary Examiner* — Chineyere D Wills-Burns
(74) *Attorney, Agent, or Firm* — John L. Rogitz

(57) ABSTRACT

An image from a camera on, e.g., a VR HMD is identified of a hand grasping a computer game controller. The image may be cropped to a region containing the controller and the hand to simplify processing, and a virtual representation of the hand is presented on a display such as the HMD, with the virtual representation being generated based on both image analysis of the region and a touch signal from the controller.

19 Claims, 9 Drawing Sheets

(56) References Cited

U.S. PATENT DOCUMENTS

2018/0059777 A1\* 3/2018 Kobayashi .......... G06F 3/04842
2019/0087068 A1\* 3/2019 Noguchi ................ G06F 3/011
2019/0102927 A1\* 4/2019 Yokokawa ............. G06F 3/014
2019/0236344 A1\* 8/2019 Chen ..................... G06V 40/28

OTHER PUBLICATIONS

Newell et al., "Stacked Hourglass Networks for Human Pose Estimation", Computer Vision—ECCV 2016.
Sun et al., "Deep High-Resolution Representation Learning for Human Pose Estimation", Proceedings of the IEEE/CVF Conference on Computer Vision and Pattern Recognition (CVPR), 2019, pp. 5693-5703.
Tompson et al., "Efficient Object Localization Using Convolutional Networks", Proceedings of the IEEE Conference an Computer Vision and Pattern Recognition (CVPR), 2015, pp. 648-656.
Toshev et al., "DeepPose: Human Pose Estimation via Deep Neural Networks", IEEE Conference on Computer Vision and Pattern Recognition, 2014.
Wei et al., "Convolutional Pose Machines", Proceedings of the IEEE Conference on Computer Vision and Pattern Recognition (CVPR), 2016, pp. 4724-4732.
Xiao et al., "Simple Baselines for Human Pose Estimation and Tracking", Proceedings of the European Conference an Computer Vision (ECCV), 2018, pp. 466-481.
"International Search Report and Written Opinion", dated Jan. 28, 2022, issued in the counterpart PCT application PCT/US21/060317.

\* cited by examiner

IMAGE BASED FINGER TRACKING PLUS CONTROLLER TRACKING

FIELD

The application relates generally to image-based finger tracking plus controller tracking in computer simulations such as computer games.

BACKGROUND

Hand tracking is desirable for applications such as virtual reality (VR) computer gaming to present virtualized representations of a user's hands on a display such as a VR head-mounted display (HMD) during play of a computer game in which, for example, the user is to pick up a virtual object.

Tracking hands using cameras on, e.g., a HMD is possible but as understood herein, when the user's hands are partially obstructed by, for example, a computer game controller being grasped by the user, both recognizing the hand and then presenting an accurate virtual portrayal of its pose is complicated. Tracking a hand based on sensors on a controller can yield "dead zones" for parts of the hands that are not located near a sensor and for parts of the hand such as the thumb that can assume a wide degree of freedom of movement.

SUMMARY

Accordingly, an apparatus includes at least one processor programmed with instructions to identify an image from at least one camera of a hand grasping a computer game controller. The instructions are executable to crop the image to a region containing the controller and the hand, and to present on a computerized display a virtual representation of the hand generated at least in part based on image analysis of the region and at least one touch signal from the controller.

In some embodiments, the camera is mounted on a head-mounted display (HMD). The apparatus may include the HMD. In example implementations the touch signal can be generated from manipulation of a control key element of the controller, and/or from a sensor on the controller other than a control key element of the controller.

The instructions can be executable to generate, using the touch signal, a virtual representation of a portion of the hand blocked from the camera by the controller. In some embodiments the instructions may be executable to generate the virtual representation without using hand recognition and using controller recognition responsive to identifying a touch signal from the controller.

In examples, the instructions can be executable to execute a machine learning (ML) module to generate the virtual representation by modifying keypoints of a template image based on the image in the region and the touch signal from the controller. The ML model may include at least one neural network (NN) and at least one heatmap.

In another aspect, a method includes identifying an image of a hand grasping a computer simulation controller. The method also includes receiving from the computer simulation controller at least one touch signal and based on both the image of the hand and the touch signal, generating an image of a virtual hand for display thereof.

In another aspect, a device includes at least one computer storage that is not a transitory signal and that in turn includes instructions executable by at least one processor to receive at least one image of a human hand grasping a computer game controller, receive at least one touch signal from the controller, and generate, based on both the image and the touch signal, a virtual hand representing the human hand for presentation of the virtual hand on at least one computerized display.

The details of the present application, both as to its structure and operation, can best be understood in reference to the accompanying drawings, in which like reference numerals refer to like parts, and in which:

DETAILED DESCRIPTION

Figure 1:
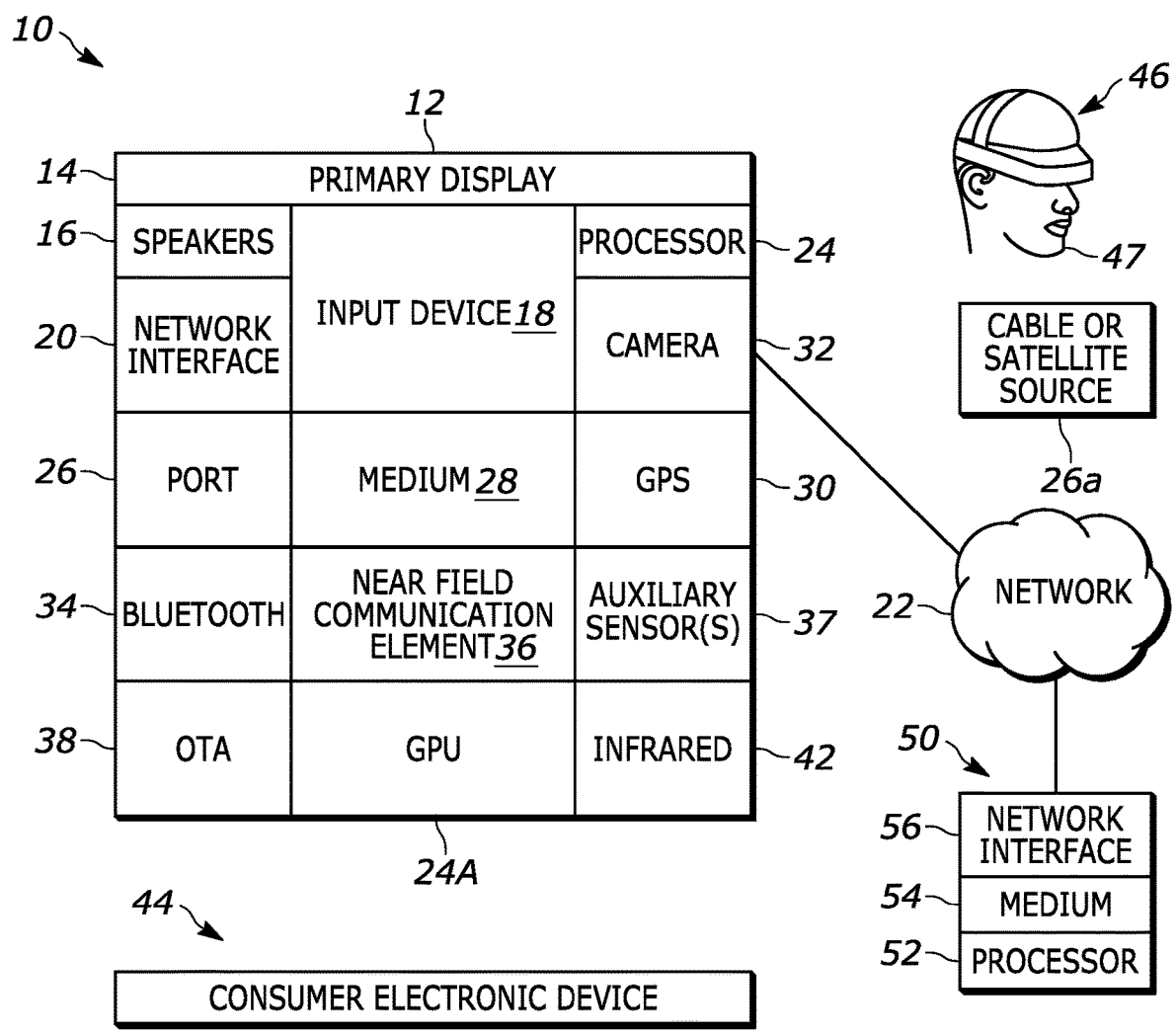
FIG. 1 is a block diagram of an example system showing computer components some or all of which may be used in various embodiments.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or the server 50 may be implemented by one or more game consoles or other computers in the same room as the other devices shown in FIG. 1 or nearby.

Figure 2:
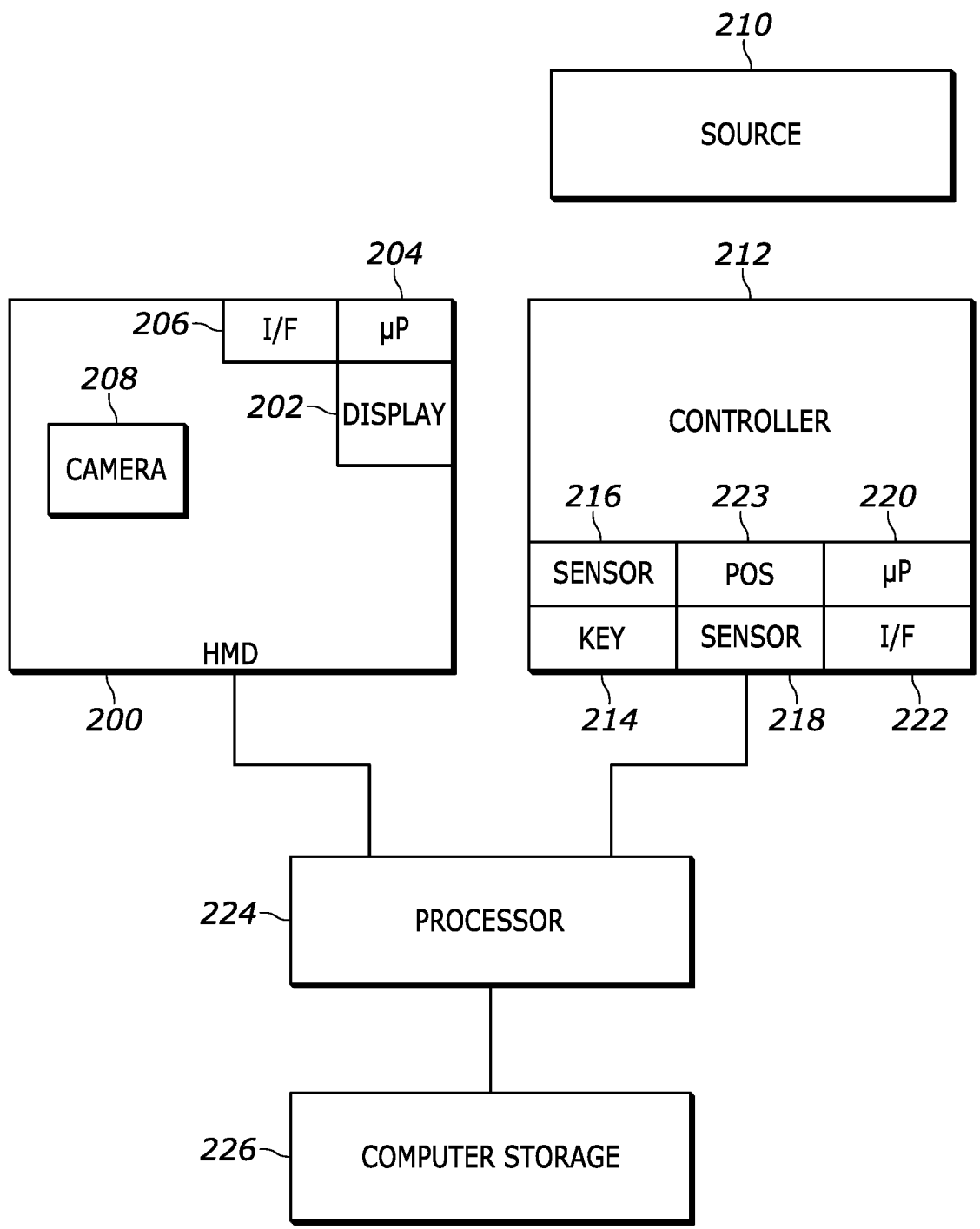
FIG. 2 illustrates an example system showing components of a head-mounted display, computer simulation controller, and virtual image processor.

FIG. 2 illustrates a display device 200 such as a virtual reality (VR) head-mounted display (HMD) that, like the other components shown in FIG. 2, may incorporate any or all of the components discussed above in relation to FIG. 1. The example HMD 200 shown in FIG. 2 may include one or more video displays 202 controlled by one or more processors 204 that may communicate wirelessly with other components using one or more wireless network interfaces 206. The HMD 200 also may include one or more outward-oriented cameras 208 for imaging objects such as hands of the wearer of the HMD 200.

The HMD 200 may be used to play a video game executed by a source 210 such as a video game console and/or remote server under control of one or more hand-held controllers 212. The controller 212 may include one or more manipulable control keys 214 to control play of the game or simulation, each of which may be associated with one or more sensors 216 to generate signals representative of manipulation of or contact with the associated control key 214. Also, the controller 212 may include one or more non-control key sensors 218 that are not associated with control keys but that are positioned on the controller 212 at known locations to sense contact by or proximity of a hand with the sensor 218, providing signals indicative thereof. The controller 212 may include one or more processors 220 configured to send signals from the sensors 216, 218 and control key 214 to other components using one or more network interfaces 222. The controller may also include one or more position sensors 223 such as inertial sensors, global positioning satellite sensors, accelerometers, magnetometers, gyroscopes, and combinations thereof.

On or more processors 224 such as any of the processors described herein may receive signals from other components in FIG. 2 and may access instructions on one or more computer storages 226 to undertake logic consistent described herein consistent with present principles.

Figure 3:
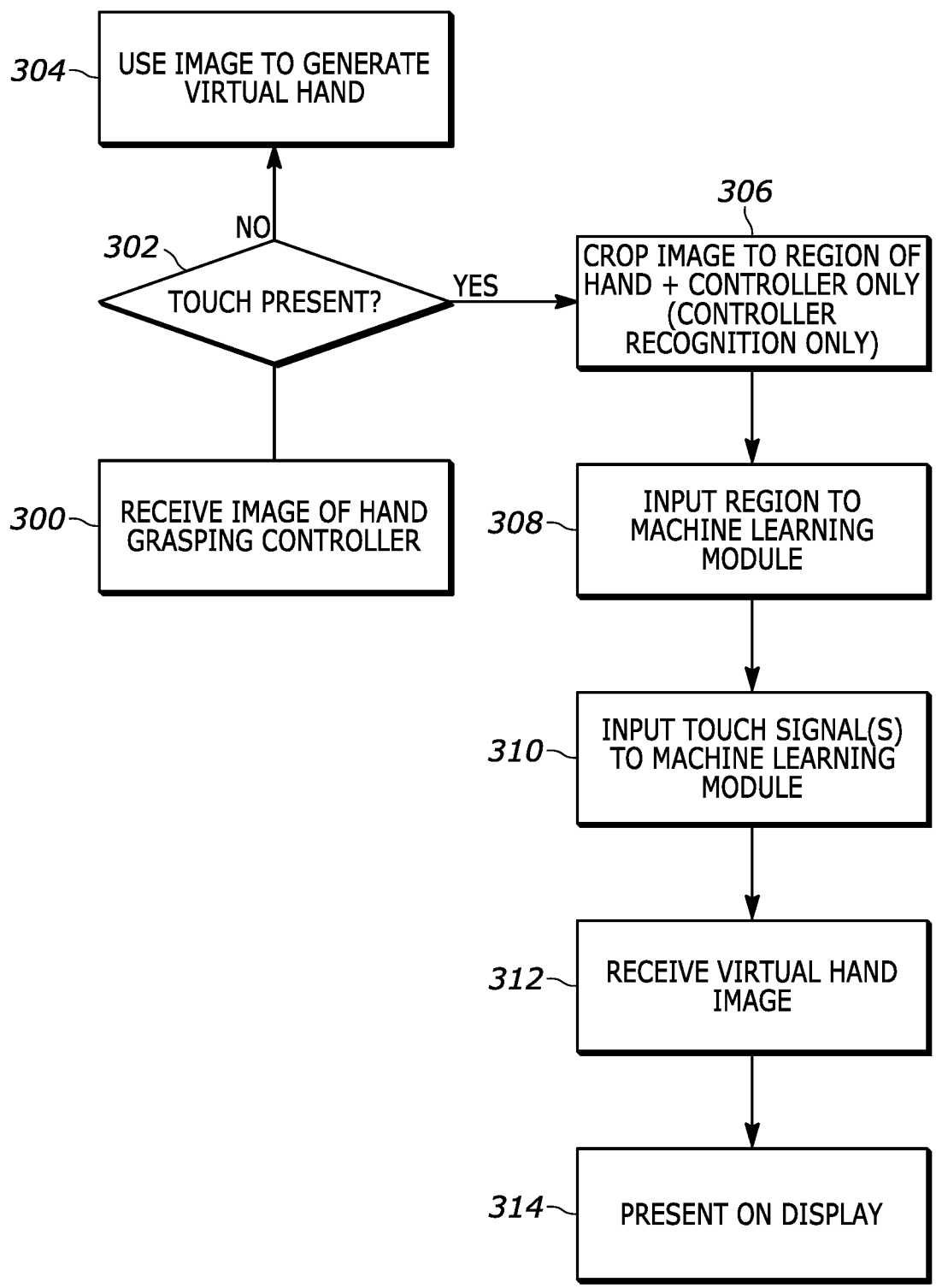
FIG. 3 illustrate example logic in example flow chart format for generating an image of a virtual hand based on both camera images and touch signals from the controller.
Figure 4:
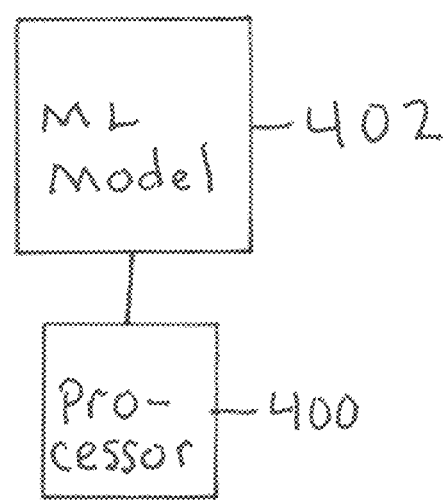
Figure 5:
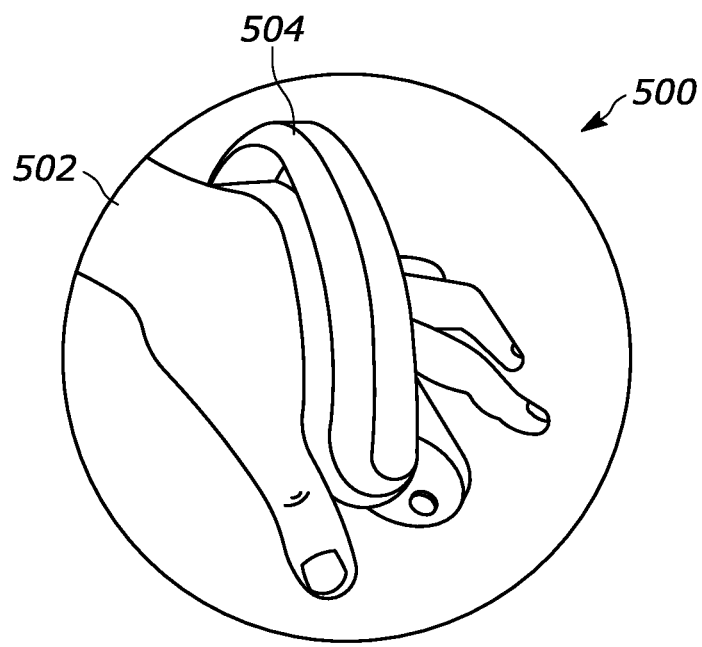
FIGS. 5-9 illustrate various example poses of a human hand grasping an example computer game controller.
Figure 6:
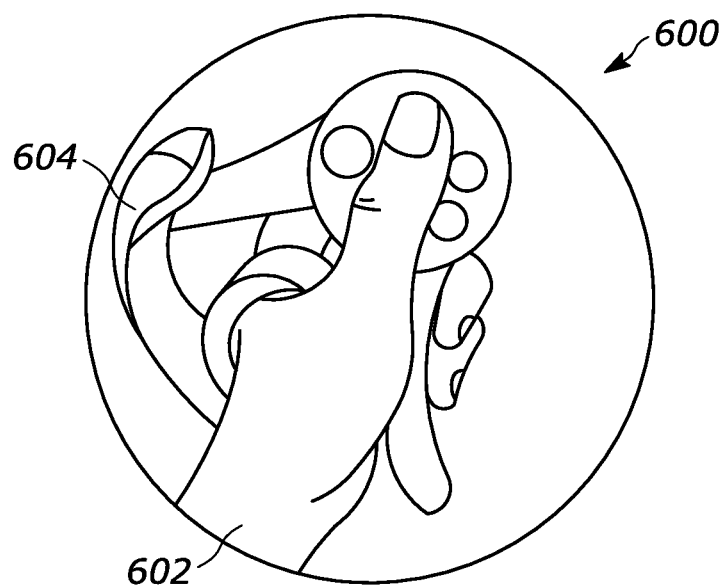
Figure 7:
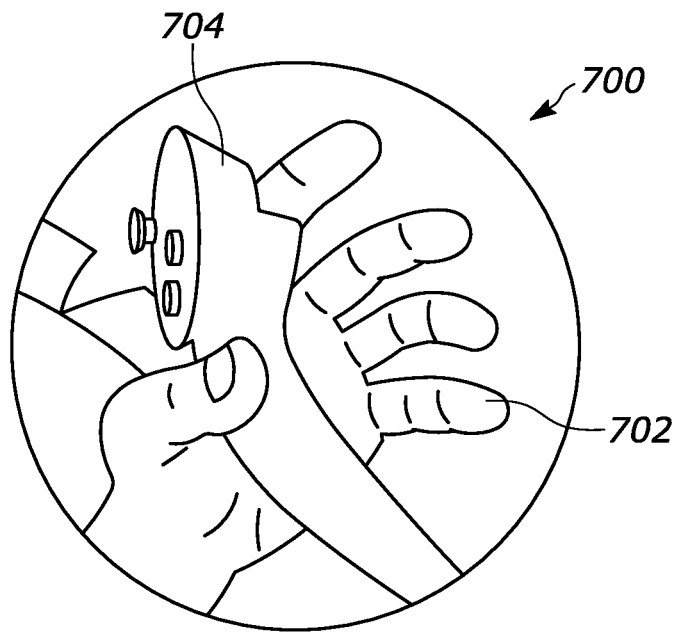
Figure 8:
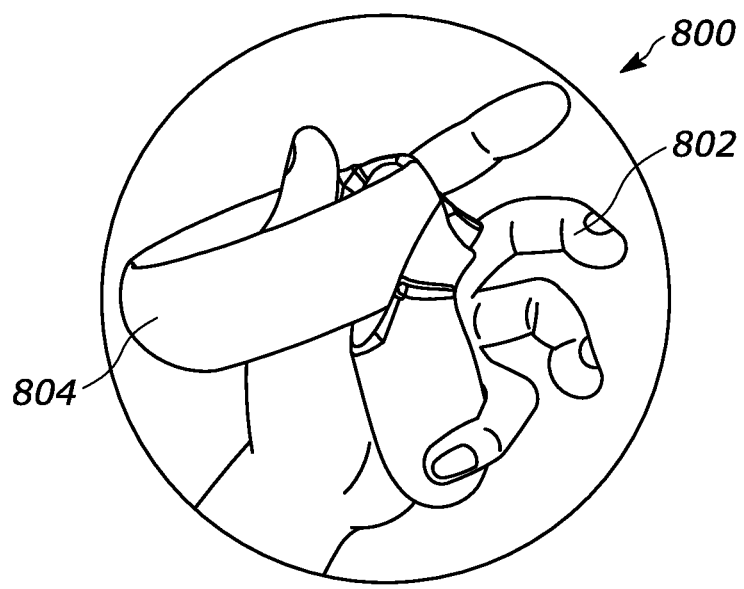
Figure 9:
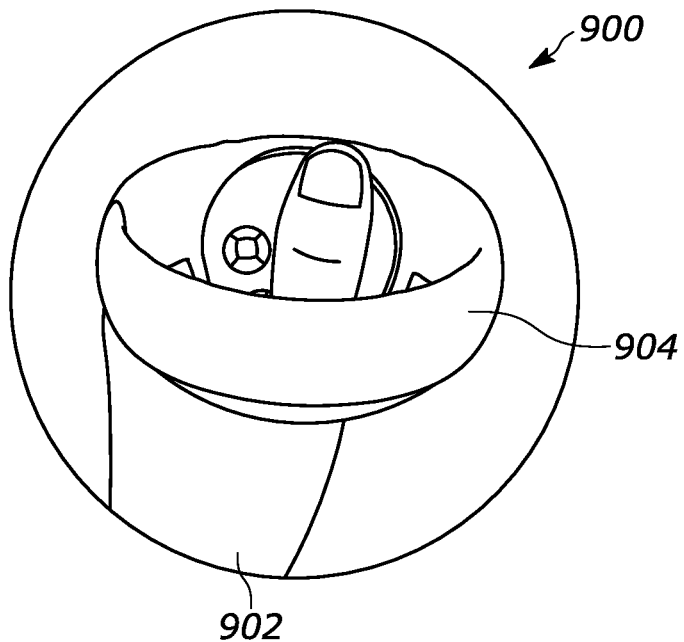

An example of such logic is illustrated in FIG. 3 and may be executed by any processor or combination of processors shown herein. Commencing at block 300 an image is received from, e.g., the camera 208 of a controller 212 that may be held by a human hand. Moving to decision diamond 302, it is determined whether a signal from any of the controller sensors 216, 218 is received, indicating that the controller is in fact being held. If not, the logic may move to block 304 to execute image recognition of a hand in free space and generate a virtual representation of the hand based only on the image of the hand.

However, if it is determined that the controller is being held as represented by the signals from the sensors of the controller, the logic moves to block 306 to crop the image to only the region of the controller plus surrounding object, which can be inferred to be a hand. In this way image recognition may be performed only for recognizing a controller instead of more complex image recognition to recognize a hand. The remaining image region after cropping may be processed through super-resolution if desired to bring out image details.

Proceeding to block 308, the cropped image can be analyzed to determine the pose of the hand based on both the image and the signals from the controller sensors 216, 218. In general, the portions of the object surrounding the controller image and inferred to be part of a human hand can be used to render a part of a virtual image of the hand, with the signals from the controller representing contact points being used to "fill in" the unseen portions of the hand behind the image of the controller.

The reference frame of the visible portions of the hand may be registered with the reference frame of the controller in various ways. For example, the position of the controller 212 may be derived from signals from the position sensor 223 and the visible portions of the hand registered using machine vision to the locations of sensors 216, 218 indicating contact and converted to the reference frame of the controller as represented by the position sensor 223. Or machine vision may be used to establish a reference frame based on a centroid of the hand image and register controller position to the centroid based on the locations of sensors 216, 218 indicating contact.

Yet again, when a machine learning (ML) module is used as described further below, the model may be trained on ground truth images of hands holding controllers along with accompanying ground truth sensor signals and ground truth resultant virtual whole hand image corresponding to the partial hand image holding the controller and the corresponding sensor signals.

Indeed, FIG. 3 illustrates that the cropped region of the controller with hand may be input to a ML module at block 308, with corresponding touch signals from the controller sensors 216, 218 generated at the same time the image was generated being input to the ML module at block 310. The ML module uses both the sensor signals and controller/hand image to output at block 312 a virtual image of a complete hand in the same pose as it is in grasping the controller in the cropped region generated at block 306. The virtual image is presented on a display such as the HMD 200 at block 314.

FIGS. 5-9 show respective cropped images 500-900 of hands 502-902 grasping controllers 504-904 that may represent ground truth images for training and actual post-training cropped images that are generated at block 306 in FIG. 3.

Figure 10:
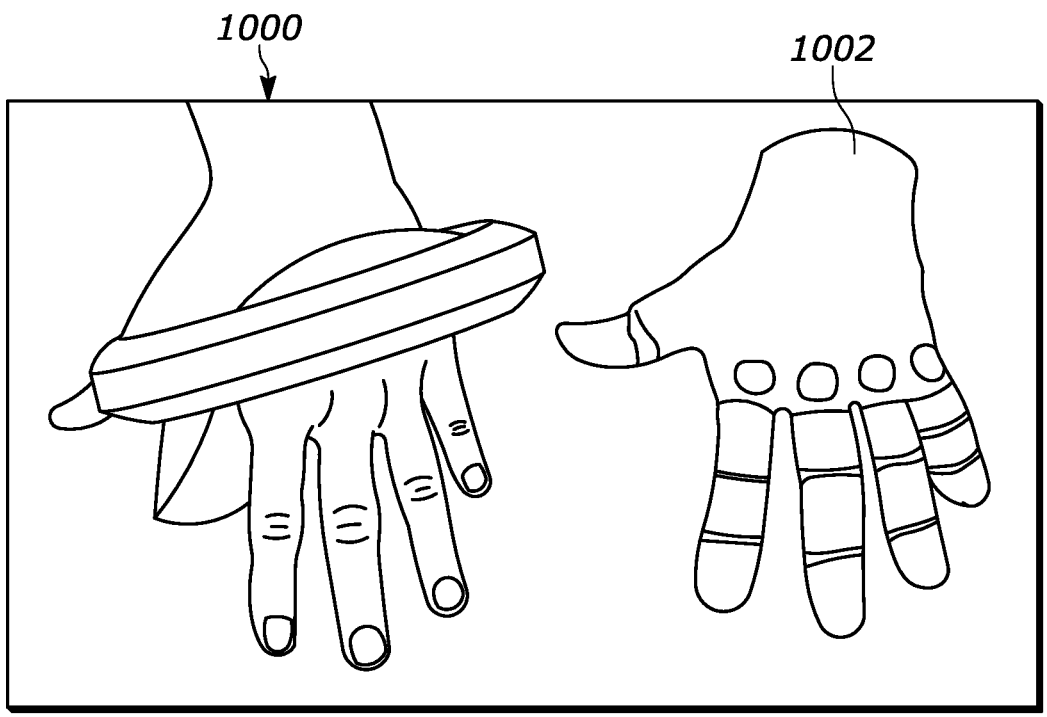
FIG. 10 illustrates an image of a hand holding a controller and associated whole hand virtual image.

FIG. 10 illustrates a cropped controller/hand image 1000 and resultant virtual whole hand image 1002 generated using the image 1000 and sensor signals, which can illustrate ground truth input during ML module training or as an illustration of a virtual hand image output at block 312 of FIG. 3.

Figure 11:
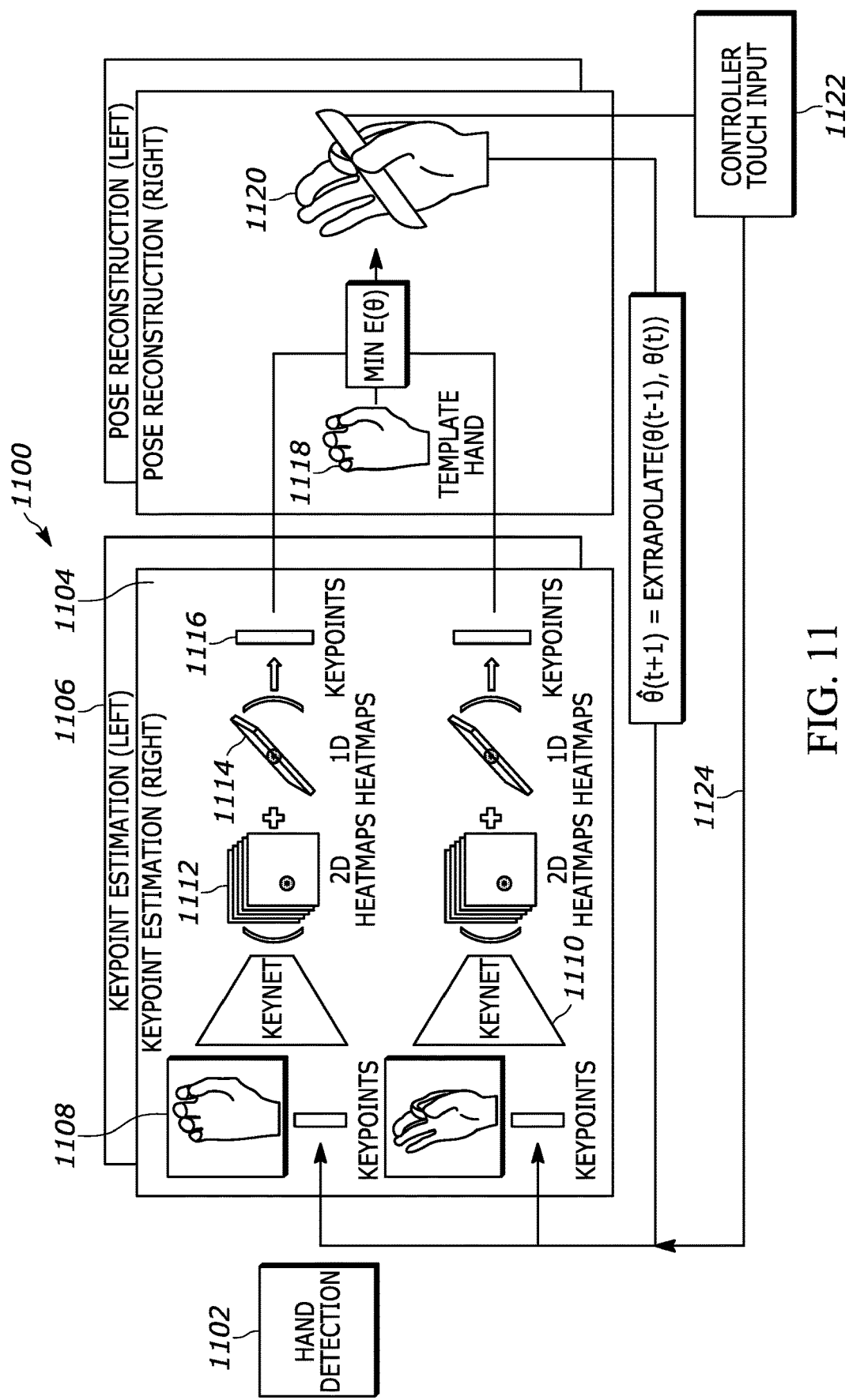
FIG. 11 illustrates an example machine learning (ML) module that may be used to generate the image of the virtual hand.

FIG. 11 illustrates an example ML module or engine 1100 that may be used in which initial hand detection 1102 need not be used. Instead, as described previously left and right keypoint estimation stages 1104, 1106 (details of the right stage 1104 only shown for clarity) may receive multiple images 1108 of a hand holding a controller, cropped if desired and up-res'd using super-resolution if desired according to principles discussed elsewhere herein. The images 1108 may be processed through key neural networks 1110, such as but not limited to convolutional neural networks (CNN).

The key NNs 1110 produce both two dimensional (2D) and 1D heatmaps 1112, 1114, from which keypoints 1116 are derived for altering the pose of a template hand 1118 according to the keypoints 1116. Model parameters are learned by optimizing min E(θ). This is but one heatmap technique that may be used.

This produces an initial whole hand virtual image 1120. Controller sensor signals 1122 from the controller in the images 1108 are fed back as indicated by the line 1124 to the key NN 1110, and/or the controller touch input signals 1122 may be fed directly into the key NN 1108 along with the images 1108.

With respect to the example heat map technique discussed herein, in one non-limiting implementation, K heatmaps of size W0×H0,{H1, H2, . . . , Hk} may be estimated, where each heatmap Hk indicates the location confidence of the kth keypoint of the virtual hand to be rendered. (K keypoints in total). "*Efficient Object Localization Using Convolutional Networks*", Tompson et al., arXiv:1411.4280v3 (June, 2015) describes such an approach in which heatmaps are generated by running an image through multiple resolution banks in parallel to simultaneously capture features at a variety of scales. The output is a discrete heatmap instead of continuous regression. A heatmap predicts the probability of the joint occurring at each pixel. A multi-resolution CNN architecture (coarse heatmap model) is used to implement a sliding window detector to produce a coarse heatmap output. This is but one example heatmap technique that may be used.

Figure 12:
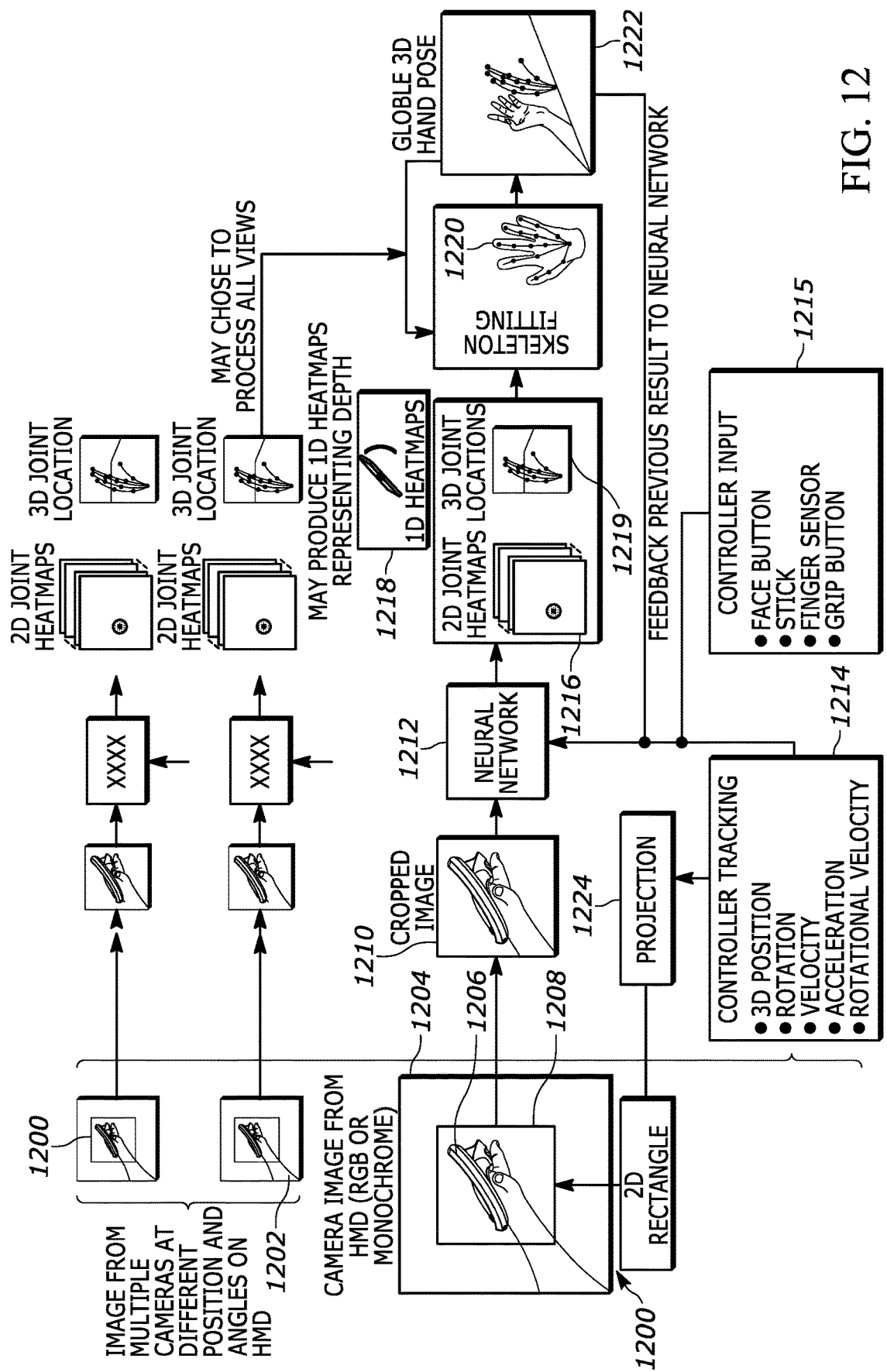
FIG. 12 illustrates an example system flow.

Referring to FIG. 12, system flows 1200, 1202 for plural images from respective plural cameras are shown that are essentially identical to each other. Accordingly, system flow 1200 is shown and disclosed in detail.

An image 1204 is received with a simulation controller 1206 being recognized in a rectangle sub-area 1208 of the image 1204 to permit a cropped image 1210 within the rectangle to be generated. The cropped image 1210 is input to one or more neural network(s) 1212, which also receives controller tracking information 1214. The tracking information 1214 may include location of the controller 1206 in space, rotation of the controller, velocity and acceleration of the controller, and rotational velocity of the controller as indicated by one or more sensors in the controller such as inertial motion units (IMU), magnetometers, accelerometers, and gyroscopes. As discussed above, the neural network(s) 1212 may be trained using ground truth images of hands holding controllers and accompanying controller tracking input. Note that as mentioned elsewhere herein and as shown in FIG. 12, the neural network(s) 1212 also may receive information from controller input element(s) 1215 such as a face button and/or joystick and/or finger sensor and/or grip button.

The neural network(s) 1212 may output two-dimensional heat maps 1216 a one-dimensional heat map 1218 representing depth, with resulting hand joint locations 1219 in three dimensions. These parameters are used for skeleton fitting 1220, which is used to present an image 1222 of the pose of the hand in the image 1204 in three dimensions. The skeleton fitting is a result of a calibration process in which the fixed bone length is obtained. Skeleton fitting attempts to minimize the difference (energy) between heatmap and the joint position projected to the heatmap, as well as the temporal change with the last frame, obtaining, as a result, the optimal joint rotations of the calibrated skeleton structure.

If desired, controller tracking 1214 may be used for projection 1224 of images of the rectangle 1208.

It will be appreciated that whilst present principals have been described with reference to some example embodiments, these are not intended to be limiting, and that various alternative arrangements may be used to implement the subject matter claimed herein.

What is claimed is:

1. An apparatus comprising:
   at least one processor programmed with instructions to:
   identify an image from at least one camera of a hand grasping a computer game controller;
   crop the image to a region containing the controller and the hand; and
   present on a computerized display a virtual representation of the hand generated at least in part based on image analysis of the region and at least one touch signal from the controller, wherein the instructions are executable by the processor to:
   execute a machine learning (ML) module to generate the virtual representation by modifying keypoints of a template image based on the image in the region and the touch signal from the controller.

2. The apparatus of claim 1, wherein the at least one camera is mounted on a head-mounted display (HMD).

3. The apparatus of claim 2, comprising the HMD.

4. The apparatus of claim 1, wherein the touch signal is from a control key element of the controller.

5. The apparatus of claim 1, wherein the touch signal is from a sensor on the controller other than a control key element of the controller.

6. The apparatus of claim 1, wherein the instructions are executable by the processor to generate, using the touch signal, a virtual representation of a portion of the hand blocked from the camera by the controller.

7. The apparatus of claim 1, wherein the instructions are executable by the processor to generate the virtual representation without using hand recognition and using controller recognition responsive to identifying a touch signal from the controller.

8. The apparatus of claim 1, wherein the ML model comprises at least one neural network (NN) and at least one heatmap.

9. A method, comprising:
   identifying an image of a hand grasping a computer simulation controller;
   receiving from the computer simulation controller at least one touch signal; and
   based on both the image of the hand and the touch signal, generating an image of a virtual hand for display thereof.

10. The method of claim 9, comprising presenting the image of the virtual hand on a computerized display.

11. The method of claim 10, wherein the computerized display comprises a head-mounted display (HMD).

12. The method of claim 9, comprising cropping the image of the hand grasping the computer simulation controller to a region containing the controller and the hand, and generating the image of the virtual hand using only the region and no other parts of the image of the hand grasping the computer simulation controller.

13. The method of claim 9, wherein the touch signal is from a control key element of the controller.

14. The method of claim 9, wherein the touch signal is from a sensor on the controller other than a control key element of the controller.

15. The method of claim 9, comprising generating using the touch signal, a virtual representation of a portion of the hand blocked from a camera view by the controller.

16. The method of claim 9, comprising generating the image of the virtual hand without using hand recognition and using controller recognition responsive to identifying a touch signal from the controller.

17. The method of claim 9, comprising
executing a machine learning (ML) module to generate the virtual representation by modifying keypoints of a template image based on the image in the region and the touch signal from the controller.

18. The method of claim 17, wherein the ML model comprises at least one key neural network (NN) and at least one heatmap.

19. A device comprising:
at least one computer storage that is not a transitory signal and that comprises instructions executable by at least one processor to:

receive at least one image of a human hand grasping a computer game controller;

receive at least one touch signal from the controller; and generate, based on both the image and the touch signal, a virtual hand representing the human hand for presentation of the virtual hand on at least one computerized display.

* * * * *